United States Patent [19]

Matsumoto

[11] 3,874,577

[45] Apr. 1, 1975

[54] DEVICE FOR TEMPORARILY STOPPING TAPE TRAVEL IN CARTRIDGE TYPE TAPE RECORDER

[75] Inventor: Shigeru Matsumoto, Hiratsuka, Japan

[73] Assignee: Victor Company of Japan, Ltd., Yokohama, Kanagawa-ken, Japan

[22] Filed: June 9, 1972

[21] Appl. No.: 261,336

[30] Foreign Application Priority Data

June 9, 1971 Japan ................................ 46-48696
June 9, 1971 Japan ................................ 46-48697

[52] U.S. Cl. .................................... 226/90, 242/197

[51] Int. Cl. ............................................ B65h 17/20

[58] Field of Search ......... 226/89, 90, 91, 174, 176, 226/181; 242/197, 198, 199, 200; 274/4 B, 4 C, 4 E, 4 F, 11 B, 11 C; 340/93

[56] References Cited

UNITED STATES PATENTS 3,475,031 10/1969 Kuehnlein ....................... 242/198 X
3,524,651 8/1970 Ketzer ............................ 242/198 X
3,610,497 10/1971 Ban ...................................... 226/89
3,773,334 11/1973 Naito .................................. 274/4 F

*Primary Examiner*—Richard A. Schacher
*Attorney, Agent, or Firm*—Holman & Stern

[57] ABSTRACT

A device for temporarily stopping the travel of the magnetic tape in a cartridge-type tape recorder, which device comprises a mechanism operating to push out and cause temporary retraction of a cartridge inserted in the tape recorder and containing a tape in traveling state, thereby to separate the cartridge and a pinch roller installed therein from a capstan in the tape recorder and thereby to stop temporarily the travel of the tape, interposed and clamped therebetween. By releasing the cartridge from its state of temporary retraction, it is again pushed into operational position by cartridge pushing and holding means thereby to cause resumption of the tape travel.

4 Claims, 8 Drawing Figures

DEVICE FOR TEMPORARILY STOPPING TAPE TRAVEL IN CARTRIDGE TYPE TAPE RECORDER

BACKGROUND OF THE INVENTION

This invention relates to a device for temporarily stopping the travel of the tape in a cartridge type tape recorder, and more particularly to a device of this class wherein the travel of an endless magnetic tape contained within a cartridge is temporarily stopped by causing the cartridge to retract slightly.

In a tape recorder, in general, there are instances when it is necessary to stop the travel of the tape temporarily during reproducing from or recording on the magnetic tape in a cartridge and subsequently cause the tape to travel again and recommence reproducing or recording. When such a necessity arises in a conventional tape recorder of the open-reel type or the cassette type, the travel of the tape is stopped by separating and thereby disengaging a pinch roller from a capstan and the tape clamped therebetween.

In a cartridge-type recorder, however, since the pinch roller is not installed in the tape recorder but is disposed within the cartridge, the provision of a mechanism for disengaging the pinch roller from the tape is difficult, wherefor it has not been possible to stop the tape travel temporarily during operation.

SUMMARY OF THE INVENTION

Accordingly, it is a main object of the present invention to provide a simple mechanism capable of temporarily stopping the tape travel in a cartridge-type tape recorder.

Another object of the invention is to provide a device capable of temporarily stopping the tape travel during reproduction or recording in a cartridge-type tape recorder and, thereafter, of causing the tape travel to recommence in accordance with necessity.

Still another object of the invention is to provide a device capable by means of an extremely simple mechanism of stopping, the tape travel temporarily and of maintaining that stopped state for a necessary time period.

Other objects, features, and utility of the invention will be apparent from the following detailed description with respect to preferred embodiments of the invention when read in conjunction with the accompanying drawings, throughout which like parts are designated by like reference numerals.

DETAILED DESCRIPTION

Figure 1:
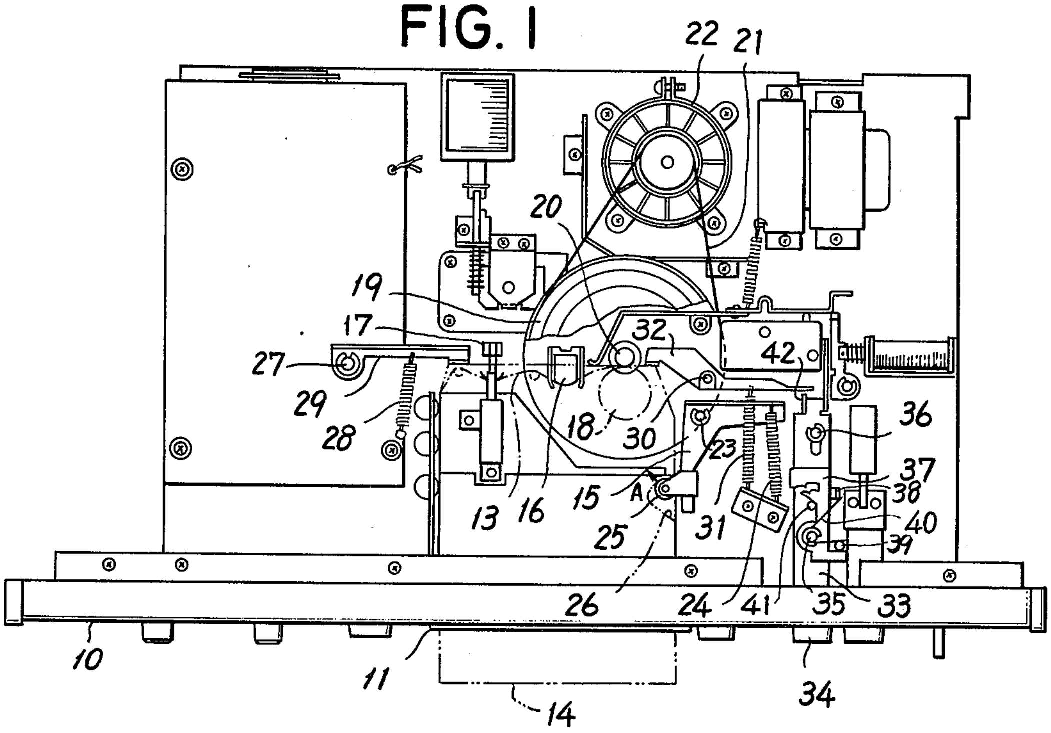
FIG. 1 is a plan view showing a cartridge-type tape recorder in which one embodiment of the invention is applied, the tape recorder being shown with its top cover removed.
Figure 2:
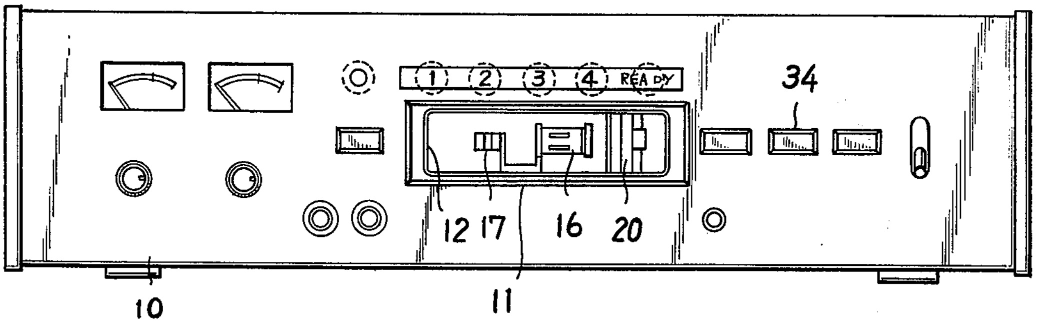
FIG. 2 is a front elevation of the tape recorder shown in FIG. 1.

As conductive to a full understanding of the nature and utility of the present invention, the following brief description of the essential features of a tape recorder of cartridge type to which the invention can be applied will be first presented. In starting the operation of the tape recorder, a cartridge 14 containing an endless tape 13 is first inserted into the tape recorder interior through a central opening 12 of a cartridge inlet escutcheon 11 provided in the front panel 10 of the tape recorder. When the cartridge 14 is inserted into a specific loaded position in the tape recorder, the cartridge is engaged at a part thereof and thereby locked by a pressure roller 25 provided on one end of cartridge pressing lever 15 of a mechanism described hereinafter. When the cartridge 14 is thus inserted into the loaded position, a magnetic tape 13 contained within the cartridge is thereby brought into contact with a magnetic head 16, a sensor 17, and other components which project into the cartridge through an opening in the front or leading surface thereof.

On one hand, a pinch roller 18 provided within the cartridge 14 presses against a capstan 20 rotating unitarily with a flywheel 19, whereby the magnetic tape 13 is clamped and held between the pinch roller 18 and the capstan 20. The capstan 20 is rotating together with the flywheel 19 rotated by power generated by a motor and transmitted by way of a driving belt 21 and thereby drives the magnetic tape 13 to cause it to travel.

Figure 3:
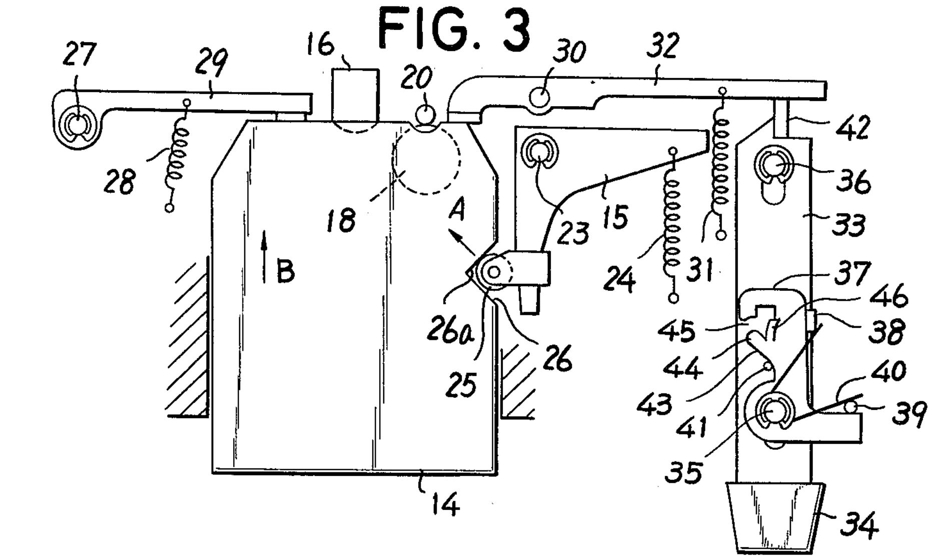
FIG. 3 and 4 are plan views showing the essential parts of one embodiment of the device according to the invention for a description of their operation and respectively indicating the tape travelling state and the stopped state.
Figure 4:
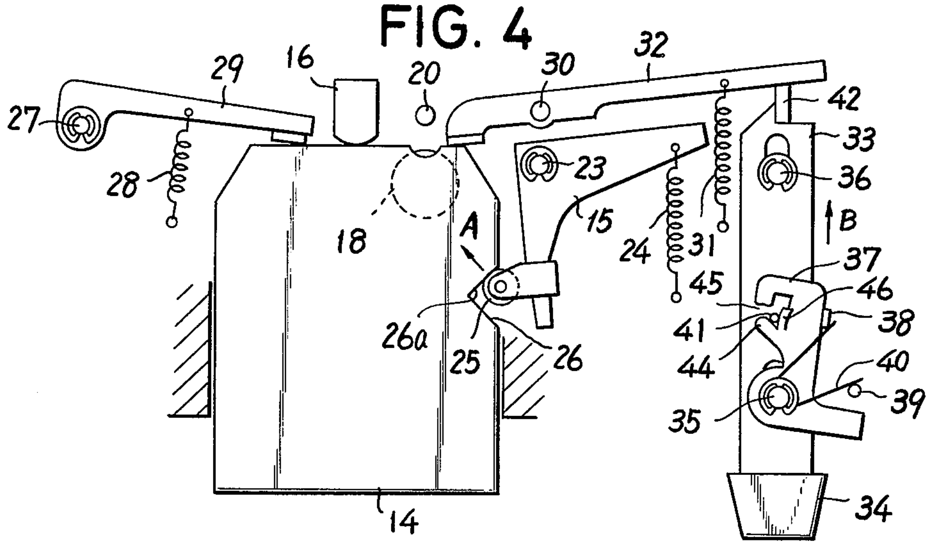

Referring to FIGS. 3 and 4 showing the essential parts of one embodiment of the device of the invention, FIG. 3 indicates the state wherein a cartridge is inserted into the tape recorder, and the magnetic tape 13 is traveling. A cartridge pressing lever 15 having the shape of a bell crank and pivoted on a pivot pin 23 is urged to rotate in the clockwise direction as viewed in FIGS. 3 and 4 by a tension spring 24 connected at one end to the end of one arm of the lever 15. A pressure roller 25 is rotatably supported on the end of the other arm of the lever 15 and is caused by the force exerted by the spring 24 and transmitted through the lever 15 to contact the side wall *26a* nearer the front end of the cartridge of two side walls of a V-shaped cutout recess 26 formed in one side wall (the right side as viewed in FIGS. 3 and 4) of the cartridge 14 and thereby to impart a force to the cartridge in the direction indicated by the arrow A perpendicular to the surface of the side wall *26a*.

Although the cartridge 14 is subjected to a force in the arrow direction A, the side surface of the cartridge on the side opposite that of the V-shaped recess is in contact with the side surface of the opening in the tape recorder and thereby prevented from moving sideways. Consequently, the cartridge 14 is urged in the direction indicated by the arrow B by the component force in the cartridge longitudinal direction of the above mentioned force in the arrow direction A. As a result, the pinch roller 18 installed within the cartridge 14 is pressed against the capstan 20 over the magnetic tape 13 interposed therebetween.

On one hand, there is provided a lever 29 for pushing the cartridge out of the tape recorder. The lever 29 is pivoted at one end on a pivot pin 27 and is urged by a tension spring 28 to turn in the clockwise direction, whereby the other end thereof in contact with the front or leading end of the cartridge 14 presses against the cartridge in the direction (opposite to direction B) to press it out of the tape recorder.

The pushing force of this push-out lever 29 is caused, by suitable selection of the springs 24 and 28 and the geometric relationships of the parts, to be relatively less than the component in the direction B of the force in the direction A due to the pressing lever 15. For this reason, the cartridge 14 is held stationary in its specific loaded position and cannot be dislodged therefrom.

The front surface of the cartridge 14 is further contacted by one end of a cartridge return lever 32 pivoted at an intermediate part thereof on a pivot pin 30 and urged by a tension spring 31 to turn in the clockwise direction. The other end of this lever 32 is in pressure contact with the inner end 42 of a sliding bar 33 slidably supported in the tape recorder in a direction perpendicular to the front panel 10 by guide pins 35 and 36. The other (outer) end of this sliding bar 33 projects out of the tape recorder through an opening in the front panel 10 and is capped by a push button 34.

A lock lever 37 is pivotally supported on the guide pin 35 and is urged to turn in the counterclockwise direction by a spring 40 provided between and pressing against a projecting lug 38 of the lever 37 and a stop pin 39. In the state indicated by FIG. 3, an arm of the lever 37 is in contact with and stopped by the stop pin 39. An engagement pin 41 is embeddedly fixed to the sliding bar 33 and operates in engagement with the lock lever 37 as described hereinafter.

When the magnetic tape in traveling state is to be temporarily stopped, the push button 34 is pushed inward in the direction B, whereupon the sliding bar 33 is moved in the direction B as indicated in FIG. 4, and the inner end 42 thereof pushes and turns the return lever 32 in the counterclockwise direction, counter to the force of the spring 31. The above mentioned engagment pin 41 moves inward together with the sliding bar 33 and, as it slides along a curved surface 43 of the lock lever 37 to rotate the lock lever 37 in the clockwise direction against the force of the spring 40, advances in the direction B.

When the engagement pin 41 rides over and disengages from a projecting tip 44 at the extremity of the curved surface 43 of the lock lever 37, the lock lever 37 is released and is moved by the force of the spring 40 to rotate in the counterclockwise direction. The engagement pin 41, thereby moving relative to the lock lever 37, passes through the opening 45 thereof and engages with a recess between the projecting tip 44 and a lug 46 of the lock lever thereby to lock the sliding bar 33 in the state indicated in FIG. 4.

The other end of the return lever 32 which has been pushed and turned in the counterclockwise direction by the inner end 42 of the sliding bar 33 pushes against one part of the front surface of the cartridge 14 thereby to return the cartridge 14 slightly in the direction opposite to the direction B. At the same time, the push-out lever 29 is caused by the force of the spring 28 to press against another part of the front surface of the cartridge 14. Accordingly, the cartridge 14 is pushed back from the position indicated in FIG. 4, thereby retracting in a linear manner without becoming askew.

When the cartridge 14 thus retracts, the pinch roller 18 therewithin separates away from the capstan 20, and, although the capstan continues to rotate, the magnetic tape 13 is separated from its driving means, whereby its travel is temporarily stopped.

Since the cartridge 14 is caused to retract through only a slight distance, the pressure roller 25 does not disengage completely from the V-shaped recess 26 but remains in pressure contact with the outer end portion of the side wall 26*a* of the recess 26. Consequently, the cartridge 14 is still subjected to a force in the arrow direction A due to the roller 25.

This force is transmitted by the front surface of the cartridge 14 to the return lever 32 and, in cooperation with the force of the spring 31 of this return lever, imparts a torque to this return lever 32 tending to turn it in the clockwise direction. However, since the sliding bar 33 is locked by the engagement pin 41 engaged with the lock lever 37, the sliding bar 33 is prevented from sliding in the direction opposite to the direction B, whereby the return lever 32 is maintained in the state indicated in FIG. 4. Accordingly, the cartridge 14 also held stably in the position indicated in FIG. 4, and the temporarily stopped state of the tape is maintained.

Figure 7A:
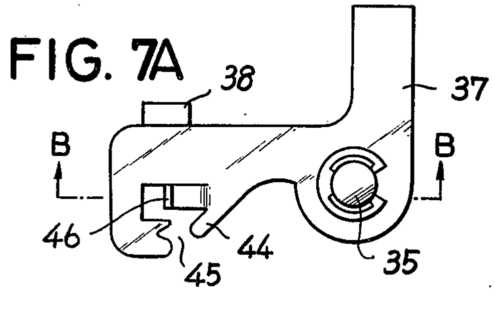
FIGS. 7A and 7B are respectively a plan view of a lock lever of one example of a lock mechanism of a push button employed in the device of the invention, and a sectional view taken along line B—B in FIG. 7A as viewed in the arrow direction.
Figure 7B:
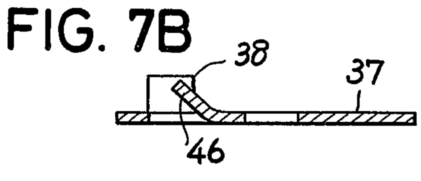

Then, when the travel of the magnetic tape 13 which has been temporarily stopped is subsequently to be resumed, the push button 34, which has been held in its pushed-in state, is pushed again, whereupon the engagement pin 41 moves slightly in the arrow direction B. The aforementioned lug 46 of the lock lever 37 is bent upward, as indicated by the sectional view of FIG. 7B, so that its tip is slightly higher than the engagement pin 41. Therefore, when the engagement pin 41 shifts in the direction B, the lock lever 37 is caused by the force of the spring 40 to turn slightly in the clockwise direction, and the engagement pin 41 moves to a position below the lug 46.

Then, when the push button 34 is released, since the sliding bar 33 is being pushed outward in the direction opposite to direction B by the end of the return lever 32, and since the engagement pin 41 has entered into a position below the lug 46 of the lock lever 37, and the lock lever 37 is installed in a manner permitting slight displacements thereof in the vertical direction, the engagement pin 41 passes the lower side of the lock lever 37 and, while lifting up this lock lever, slides in the direction opposite to the direction B together with the sliding bar 33. Consequently, the sliding bar 33 is returned to a position as indicated in FIG. 3. As a result, the return lever 32 is turned in the clockwise direction by the spring 31, and its pushing force on the cartridge 14 is removed. Accordingly, the cartridge 14 is again pushed in the direction B into its former position by the component in that direction of the force exerted by the pressure roller 25 toward the arrow direction A. As a result, the pinch roller 18 within the cartridge is pressed against the capstan 20, whereupon the magnetic tape 13 resumes its travel.

The push-out lever 29 is continually pressed against the front surface of the cartridge 14. When the cartridge is to be taken out of the tape recorder, the cartridge pressing lever 15 is temporarily turned in the counterclockwise direction by known means thereby to separate and remove the pressure roller 25 completely out of the V-shaped recess 26 and thereby to unlock the cartridge 14. Consequently, the push-out lever 29 is turned in the clockwise direction by the force of the spring 28 thereby to force the cartridge 14 thus unlocked in the outward direction opposite to the direction B.

Although not indicated in the drawings, use may be made of an alternative arrangement wherein, at the time of sliding movement of the sliding bar 33 in the arrow direction B, the push-out lever 29 is caused to turn forcefully in the clockwise direction to accomplish its return action. In this case, the lever 29 is capable of carrying out push-out action and returning action depending on its operational mode.

The pressing contact force between the pinch roller 18 and the capstan 20 is of the order of 1.5kg. for normal driving of the magnetic tape 13. To produce this pressing contact force of the pinch roller 18, the required force in the arrow direction A due to the pressure roller 25 in the instant embodiment is of the order of approximately 3kg. Accordingly, the load on the spring 24 to produce these forces is approximately 3kg. Furthermore, the force necessary for the cartridge return lever 32 to push out the cartridge 14 by overcoming the force of the cartridge pressing lever 15 is approximately 2kg. at the front surface of the cartridge and is of the order of approximately 1kg. at the part of the return lever abutted by the sliding bar 33. Accordingly, the force required to actuate the push button 34 is approximately 1 kg. or more. In addition, the force of the spring 31 required for fixing the cartridge return lever 32 is of the order of approximately 200 grams.

Figure 5:
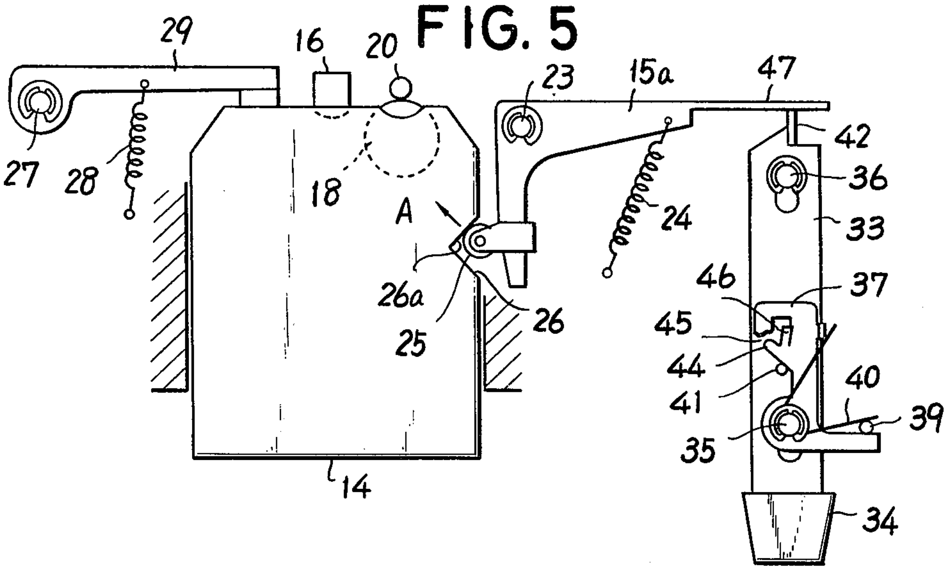
FIGS. 5 and 6 are plan views correspondingly similar to FIGS. 3 and 4 for a description of another embodiment of the device according to the invention.
Figure 6:
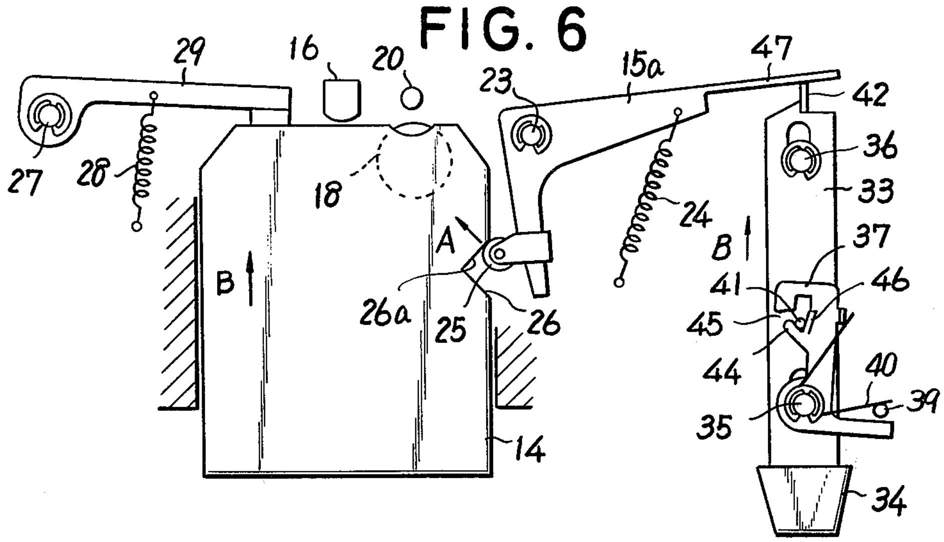

Another embodiment of the device according to the invention is illustrated in FIGS. 5 and 6, in which parts similar or equivalent to corresponding parts in the embodiment shown in FIGS. 1 through 4 are designated by like reference numerals, but detailed description thereof will be omitted.

This embodiment shown in FIGS. 5 and 6 differs from the preceding embodiment in that the return lever 32 is omitted, and, instead, a cartridge pressing lever 15a corresponding to the aforedescribed lever 15 is used. This pressing lever 15a has an extension 47, which at its outer extremity is abutted by the inner end 42 of the sliding bar 33. When, in order to stop the tape travel temporarily, the push button 34 is pushed to move the sliding bar 33 inward in the direction B, the cartridge pressing lever *15a* turns in the counterclockwise direction, and the pressure roller 25 of this lever *15a* retracts to a position in the vicinity of the outer end of the side wall *26a* of the V-shaped recess 26 as indicated in FIG. 6. As a result, the cartridge 14 is pushed back slightly in the direction opposite to the direction B by the force exerted thereon by the push-out lever 29, and the pinch roller 18 separates from the capstan 20, whereby the magnetic tape 13 stops its traveling. Since the pressing lever *15a* thus rotates through only a slight angle, the pressure roller 25 does not separate completely from the V-shaped recess 26. Accordingly, the distance through which the cartridge 14 is pushed back by the push-out lever 29 is very slight, and the cartridge is held in the position thus reached.

When the push button 34 in the pressed-in state is again pushed, the same action as that in the preceding embodiment occurs. That is, the engagement pin 41 and the lock lever 37 disengage, and the sliding bar 33 slides in the direction opposite to the direction B to return to the position indicated in FIG. 5. At the same time, the pressing lever *15a* is turned in the clockwise direction by the force of the spring 24, and the cartridge 14 is pushed by the pressure roller 25 and returns to the position indicated in FIG. 5. Consequently, the pinch roller 18 presses against the capstan 20, whereupon the magnetic tape 13 resumes its travel.

Further, this invention is not limited to these embodiments but various variations and modifications may be made without departing from the scope and spirit of the invention.

What I claim is:

1. A device for temporarily stopping the travel of a tape in a cartridge-type tape recorder, said device comprising: means for receiving a cartridge inserted thereinto, said cartridge containing therewithin an endless magnetic tape and a pinch roller and having in a side part thereof a V-shaped recess; a capstan for causing said tape to travel, said pinch roller pressing against the capstan over the tape interposed therebetween when the cartridge is thus inserted; means for driving the capstan in rotation; pressing means adapted to engage the cartridge at said V-shaped recess and operating to impart to the cartridge a pushing force in the direction to cause the pinch roller to press thus against the capstan and to hold the cartridge in the pushed state; and return means for temporarily pushing out the cartridge, counter to and overcoming the pushing and holding force of said pressing means, from its pushed and held state but not to an extent whereby the pressing means would be completely dislodged from its pushing force imparting state, said return means comprising a push button, a sliding bar for undergoing sliding movement upon being actuated by way of said push button, a return lever contacting at one end thereof the innermost front surface of the cartridge thus inserted and operating, when the push button is pressed inward to cause the sliding bar to slide inward, to rotate and push, at said other end, the cartridge counter to and overcoming the pushing and holding force of the pressing means thereby to return the cartridge slightly out from its fully inserted state, and locking means for locking the sliding bar in its position at the end of said sliding movement.

2. A device as set forth in claim 1 in which said locking means comprises an engagement pin fixed to said sliding bar and lock means operating cooperatively with said engagement pin to lock the sliding bar in its pressed-inward position when the sliding bar is first thus pressed in and to unlock the sliding bar and permit its return to its original position when it is next pressed.

3. A device as set forth in claim 2 in which said lock means comprises a lock lever having in its side surface a curved part for pressing against said engagement pin and thereby deriving a torque when the engagement pin is pressed, a first projection forming the extreme end part of said curved surface, and a second projection formed contiguously to said first projection and having an extreme end bent in a direction to clear the extreme tip of the engagement pin, a recess being formed between the first and second projections; a shaft for pivotally supporting said lock lever in a manner permitting horizontal and vertical movement thereof; and a spring for imparting to the lock lever a force such as to cause it to press against the engagement pin.

4. A device for temporarily stopping the travel of a tape in a cartridge-type tape recorder, said device comprising; means for receiving a cartridge inserted thereinto, said cartridge containing therewithin an endless magnetic tape and a pinch roller and having in a side part thereof a V-shaped recess; a capstan for causing said tape to travel, said pinch roller pressing against the capstan over the tape interposed therebetween when the cartridge is thus inserted; means for driving the capstan in rotation; pressing means adapted to engage the cartridge at said V-shaped recess and operating to impart to the cartridge a pushing force in the direction to cause the pinch roller to press thus against the capstan and to hold the cartridge in the pushed state; and return means for temporarily pushing out the cartridge, counter to and overcoming the pushing and holding force of said pressing means, from its pushed and held state but not to an extent whereby the pressing means would be completely dislodged from its pushing force imparting state, said return means comprising a push button, a sliding bar for undergoing sliding movement upon being actuated by way of said push button, and locking means for operating interrelatedly with the push button to lock the sliding bar in a pressed-in position thereof, and said pressing means comprising a presssure roller for engagement with V-shaped recess of the cartridge and a lever supporting at one end thereof said pressure roller and having at the other end thereof an extension in pressure contact with said sliding bar.

* * * * *